Feb. 1, 1966
I. W. KURETH
3,232,147
INSULATION REMOVER FOR ELECTRICAL CONDUCTORS
Filed Feb. 3, 1964
2 Sheets-Sheet 1
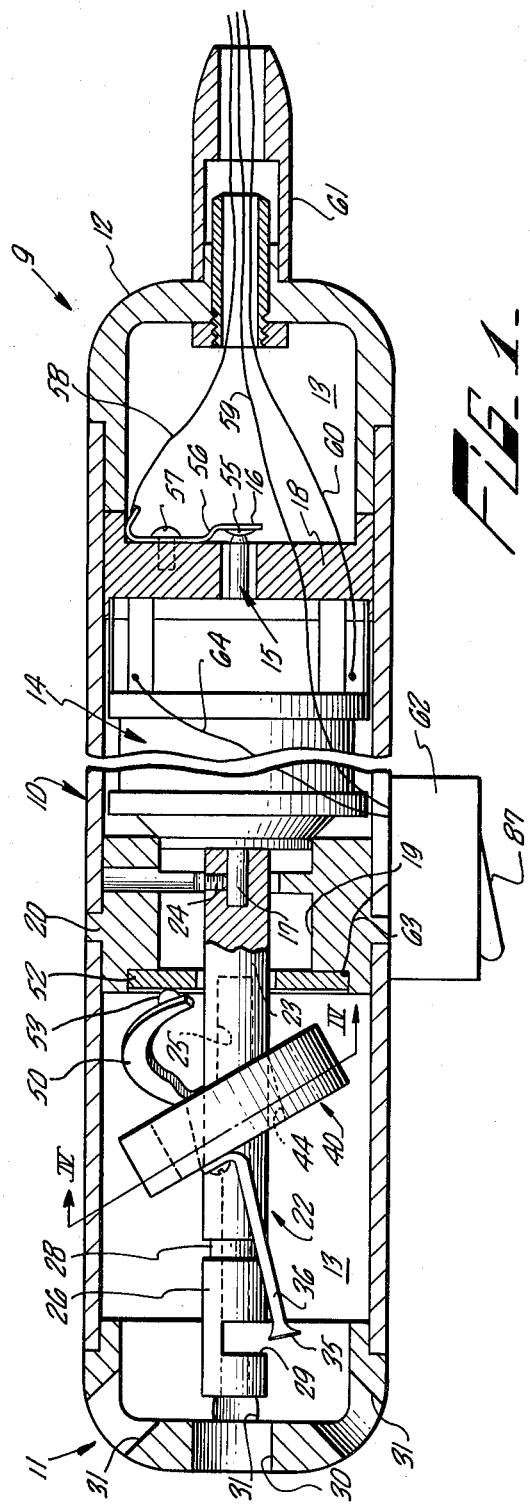
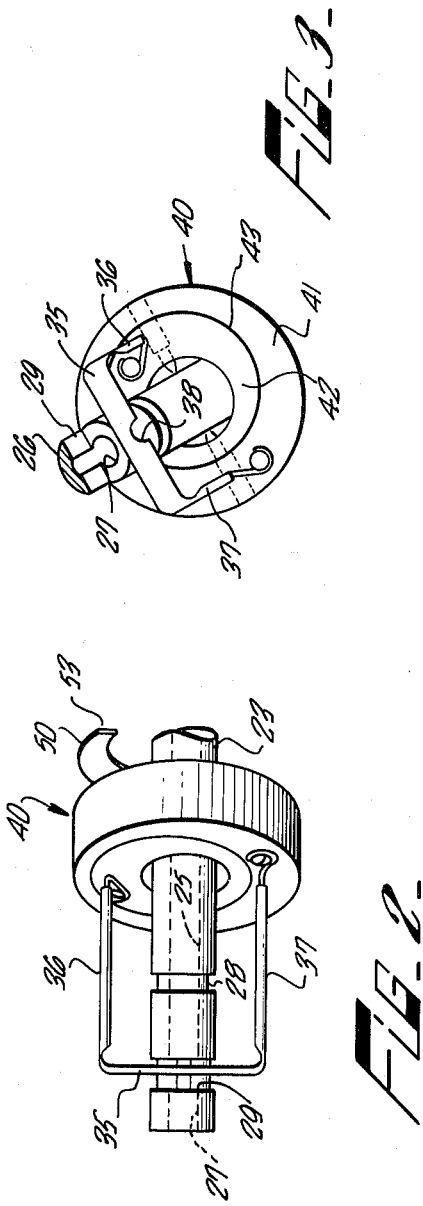
INVENTOR.
IRVEN W. KURETH
BY
Christie, Parker & Hale
ATTORNEYS

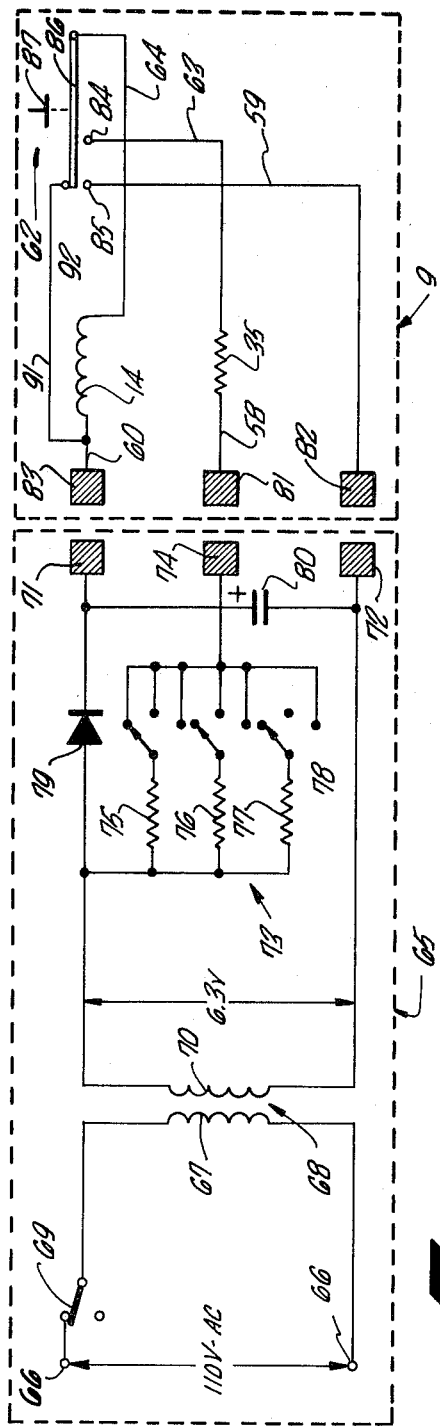

United States Patent Office 3,232,147
Patented Feb. 1, 1966

3,232,147
INSULATION REMOVER FOR ELECTRICAL CONDUCTORS
Irven W. Kureth, % Box 73, 7432 Victoria Ave., Yucca Valley, Calif.
Filed Feb. 3, 1964, Ser. No. 341,990
3 Claims. (Cl. 81—9.5)

This invention relates to an electrical conductor insulation remover or wire stripper. More particularly, it relates to a device capable of removing a segment of insulation from an electrical conductor or other material, which segment may be spaced from an end of the conductor.

The term "wire stripper" is generic to a class of devices which remove the insulation from insulated electrical conductors so that the conductors may be connected to other conductors or to terminals, for example. Wire strippers according to the prior art often are bulky, require application of considerable physical force for their operation, and have the common feature that all the insulation along a selected length of conductor at and to adjacent the end of the conductor is removed from the conductor.

Recently a technique has been developed for wiring television receivers and other electronic and/or electrical equipment in which the insulation need be removed from only a short length of the conductor. Usually, the length from which the insulation is removed is spaced from the end of the conductor. Existing wire strippers are not readily useful in preparing conductors for use in this technique.

This invention provides a small electrically powered device which is particularly suited for preparing conductors for use in the above-mentioned wiring technique. The device also may be used to prepare conductors for use according to conventional wiring techniques.

Generally speaking this invention provides a tool for removing a relatively low melting covering from a relatively higher melting cylindrical core. The tool comprises a receptacle defining an elongate open ended cavity adapted to receive the core and its covering. A heater element is disposed adjacent the cavity. Drive means are coupled to the receptacle for rotating the receptacle about the core disposed therein, and for moving the heater element into gentle engagement with the covering on the core in response to rotation of the receptacle. The tool also includes switch means operable to control the operation of the drive means and simultaneously to cause the heater element to become heated.

The above-mentioned and other features of the invention are more fully set forth in the following detailed description of the invention taken in conjunction with the accompanying drawings wherein:

FIG. 1 is an enlarged fore-shortened cross-sectional elevation view of a wire stripper according to this invention;

FIG. 2 is an enlarged fragmentary elevation view of the conductor receptacle and the heater element;

FIG. 3 is an end view of the apparatus shown in FIG. 2;

FIG. 4 is a further enlarged cross-sectional elevation view taken along the line 4—4 of FIG. 1;

FIG. 5 is a schematic diagram of the wire stripper and of a power supply therefor; and FIG. 6 is an enlarged end view of an electrical conductor which has had the insulation thereof removed by operation of the wire stripper shown in FIG. 1.

Referring initially to FIG. 1, a wire stripper 9 is shown. The wire stripper includes an elongated tubular housing 10 having end closures 11 and 12 which enclose an interior chamber 13. An electric motor 14 is disposed in the housing and has a rotatable shaft 15. An end 16 of the shaft extends axially of the housing toward closure 12. The shaft also has an opposite end 17 which extends coaxially of the housing toward closure 11. Shaft end 16 extends through a transverse partition 18 formed interiorly of the enclosure while the end 17 of the shaft is disposed within an annular bore 19 of a housing partition 20. The housing and its closures and partitions are fabricated of electrically non-conductive materials.

A conductor receptacle means 22 is secured to shaft end 17 to extend from the motor and, in effect, is an extension of the shaft. The receptacle means is fabricated of an electrically conductive base portion 23 which is secured to the electrically conductive motor shaft by a set screw 24. Receptacle base 23 defines an axial bore 25 which opens toward housing end closure 12. A cylindrical cap member 26, also defining an axial bore 27, is secured to the base by an electrically non-conductive axially bored spacer sleeve 28. The receptacle cap member has a slot 29 formed radially thereof. The slot has a depth radially of the cap member at least equal to the radius of the cap member.

Closure member 11 has an opening 30 which is coaxially aligned with the aligned bores 25 and 27 of the receptacle means. In use of the wire stripper, an insulated electrical conductor is passed through opening 30 into the aligned bores of the receptacle means. A series of venting openings 31 are formed through housing closure 11 into communication with chamber 13.

As shown in FIGS. 1, 2, and 3, a resistive heater strip 35 is disposed adjacent slot 29. The heater strip preferably is disposed transversely of the elongate extent of the receptacle and has its normal position spaced from bore 27. The heater strip is a substantially U-shaped member having parallel legs which support the central or heating portion of the strip. The heating portion of the strip has a notch 38 formed therein (see FIG. 3) on the side of the strip opposite from bore 27. The notch is aligned with the bore of the cap member. The side of the strip adjacent to the bore is substantially straight as shown in FIG. 3. The resistance of the heater strip to electricity flowing therethrough is greatest adjacent the notch 38 and, therefore, the heater strip is heated most in this area.

The heater strip is mounted to a pivot ring assembly 40. As shown most clearly in FIG. 4, the pivot ring assembly is comprised of a pair of annular rings 41 and 42. Outer ring 41 is mounted eccentrically of inner ring 42 and is supported relative to the inner ring by an electrical insulating material 43. Inner ring 42 defines an eccentric bore 44 which is substantially concentric to the cylinder defined by the outer surface of ring 41. Bore 44, as shown in FIG. 1, is inclined to the plane of the pivot ring assembly.

The pivot ring assembly is pivotally mounted to base portion 23 of receptacle means 22 by a pair of pivot pins 45 which are in mechanical contact with inner ring 42 but not with the outer ring. The pivot pins have conical tips which are engaged in diametrically opposed seats 46 of the receptacle base portion. The pivot pins are disposed so that they lie parallel to the elongate extent of slot 29 in the receptacle cap member.

As shown in FIGS. 2 and 3, the heater strip is secured to the pivot assembly so that the central portion of the heater strip is disposed parallel to the elongate extent of slot 29 adjacent the slot. Heater strip leg 36 is conductively secured to inner ring 42 of the pivot ring assembly and leg 37 is conductively secured to the outer ring.

Outer ring 41 of the pivot ring assembly carries a spring 50 (see FIG. 1) which is compressively biased between the side of ring 41 disposed toward motor 14 and a bus disc 52 carried by housing partition 20. The bus disc is axially bored to be clear of the receptacle means. The bus disc lies in a plane normal to the axis of rotation of the receptacle means. Spring 50 carries a contact 53 which is engaged with the adjacent surface of the bus ring. The spring is connected to the pivot ring assembly at a point spaced from the axis of pins 45 so that the spring acts to bias the pivot ring assembly into its normal or at-rest position in which the ring asesmbly is disposed so that the central portion of the heater strip is spaced from bore 27.

An electrical contact 55 is engaged with end 16 of motor shaft 15 and is carried on a leaf spring 56 which is secured to housing partition 18 by a screw 57. Spring 56 is connected to one of a plurality of electrical conductors 58, 59, 60 which are introduced into the housing through a suitable fitting 61 carried by housing end closure 12.

A push button switch 62 is carried by housing 10 and is connected to conductor 59. Conductor 60 is connected to motor 14. Additional conductors 63 and 64 extend from the switch to bus disc 52 and to motor 15, respectively.

FIG. 5 is an electrical schematic diagram of wire stripper 9 and of a power supply 65 for the wire stripper. The power supply includes a pair of input terminals 66 which are adapted to be connected to a commercial source of power such as, for example, a 110-volt alternating current source. The input terminals are connected to a primary winding 67 of a transformer 68. An ON/OFF switch 69 is connected between one of terminals 66 and the transformer primary winding. The secondary winding 70 of the transformer is connected between a power supply motor terminal 71 and a power supply common terminal 72. Transformer 68 is such that the voltage produced across secondary 70 preferably is approximately 6.3 volts.

A resistance selector network 73 is connected in parallel with the power supply motor terminal between the transformer secondary and a power supply heater terminal 74. The resistance selector network comprises three resistances 75, 76 and 77 and a selector switch 78 which has three ganged movable contacts, each of which is coupled to a respective one of the resistances. The resistances and associated contacts of the selector switch are coupled in parallel with one another. The selector switch is wired so that, depending upon the position of the ganged movable contacts of the switch, one, two or all of the resistances are coupled to the power supply heater terminal. The position of switch 78 determines the amount of current which is passed to heater strip 35. It is within the scope of the invention that more or less than three different heater current values may be defined by the resistance selector network.

In the event motor 15 is a D.C. motor, the power supply includes a rectifier 79 coupled between the power supply motor terminal and the transformer. A smoothing capacitance 80 is connected from between the rectifier and the power supply motor terminal to the other side of the transformer secondary winding.

While it is not shown in FIG. 1, conductors 58, 59 and 60 extend from housing 10 to a connector which is adapted to be coupled to power supply 65. The conductors extend respectively to connector contacts 81, 82, and 83 which are heater, common and motor terminals, respectively, and, when the connector is engaged with the power supply, are coupled to power supply terminals 74, 72 and 71. As shown in FIG. 5 conductor 58 is coupled between wire stripper heater terminal 81 and heater element 35. Conductor 63 in housing 10 is coupled from the heater element to a normally open contact 84 in switch 62. Common conductor 59 is coupled between wire stripper common terminal 82 and a second normally open contact 85 of the switch. Conductor 60 is coupled between the wire stripper motor terminal 83 and motor 14. Conductor 64 is coupled between motor 14 and a movable contact or blade 86 of switch 62. Upon depression of a manually engageable button 87 of the switch, motor 14 and heater 35 are energized by movement of the switch blade into engagement with switch contacts 84 and 85 if the power supply is coupled to a suitable source of power and that the ON/OFF switch is disposed in its ON condition.

FIG. 6 illustrates an end portion of an electrical conductor 88 which is enclosed within an electrically non-conductive insulation material 89. Wire stripper 9 is operated by introducing the end of the conductor into the aligned bores of conductor receptacle means 22 through housing aperture 30. The conductor is passed beyond slot 29 since heater strip 35 normally is disposed out of alignment with bore 27. When the end of the conductor has been inserted the desired length into the receptacle means, switch button 87 is depressed to energize motor 14 and heater element 35. As the receptacle means is rotated, centrifugal force acts upon pivot ring assembly 40 to cause the assembly to move into a position wherein the rings tend to be disposed normal to the elongate extent of the receptacle. Such movement of the pivot ring assembly moves heater element 35 toward the conductor until the straight edge of the heater element contacts insulation 89 on the conductor. Since the receptacle means rotates relative to the conductor, the straight edge of the heater element traces a line circumferentially of the conductor. Since the heater element is heated, the engagement of the heater element with the insulation causes the insulation to be melted or burned away and the conductor is thereby laid bare. The mechanical contact of the heater element with the insulation assists in removing the insulation. The mechanical force of the heater element on the conductor itself is not sufficient to cause the conductor to be parted. Any fumes which are generated as the insulation is severed are passed from the interior of the housing through opening 30 and through vents 31. After a gap 90 has been formed in the insulation circumferentially of the conductor, the stripper is turned off by releasing switch button 87.

As motor 14 comes to rest, the pivot ring assembly returns to the position shown in FIG. 1 because of the action of spring 50 against bus disc 52. Heater element 35 is thereby removed from alignment with bore 27 so the conductor may be removed from the wire stripper. If the width of gap 90 axially of conductor 88 is not sufficient to permit a soldered connection to the conductor, the portion of insulation 89 between gap 90 and the extreme end of the conductor may be slid along the conductor, as shown in FIG. 6, to produce a more open gap. If desired, this portion of the insulation may be removed from the conductor.

Where motor 14 is a hysteresis field motor or series wound motor, the motor is plugged to bring it to a rapid stop. Accordingly, a motor short circuiting conductor 91 is coupled in parallel with motor 14 between conductor 60 and a normally closed contact 92 of switch 62. Since shunt wound and permanent magnet motors are inherently rapid stopping, plugging conductor 91 may be deleted from wire stripper 9 when such motors are used.

When the wire stripper is operating, a circuit is formed through the heater element from the bus disc to outer ring 41 of the pivot ring assembly via spring 50. The circuit then continues from the outer ring through the heater element to the inner ring and to base member 23 of receptacle 22. The current then flows through the motor shaft to contact 55. Since the cap member is insulated from the base member of the receptacle by sleeve 28, a short circuit of the above-described circuit is prevented should the heater element come in contact with the receptacle cap member.

The apparatus described above is not restricted to use with electrical conductors. It may be used to remove a low melting covering from any cylindrical higher melting core.

Wire stripper 9 is adapted for removing insulation and the like from a wire at a location spaced from but adjacent to the end of the wire. The insulation is removed circumferentially of the wire. Those skilled in the art, however, will recognize that stripper 9 may be modified so that the insulation may be removed from the circumference of the wire at any location along the wire by providing a hollow motor shaft having the bore thereof communicating coaxially with the bores of receptacle means 22. Contact 55 would be modified to engage the side rather than the end of the motor shaft, and the coupling of the conductors 58–60 would be to the side of the housing rather than at one end of the housing. Closure 12 would define an opening coaxially of the motor shaft so that the wire which is operated on by the modified stripper can pass axially through the stripper. A stripper modified in this manner is capable of removing the insulation from the wire at a location several feet from the end of the wire; the stripper itself remains small so that it can be held in the hand of an operator.

While the invention has been described above in conjunction with specific apparatus, this has been by way of example only and is not to be considered as limiting the scope of this invention.

What is claimed is:

1. Apparatus for severing the insulation on an insulated electrical conductor comprising a shaft having an axial bore open to one end of the shaft, means coupled to the shaft for rotating the shaft, the shaft adjacent the one end thereof defining a recess which opens radially of the shaft from the bore, an electrical resistance heater strip, means disposed circumferentially of and pivotally mounted to the shaft and carrying the heater strip so that the heater strip is disposed adjacent the recess, electrical circuit forming means coupled to said last-named means for defining an electrically conductive path through the heater strip for any angular position of the shaft, and selectively operable means adapted for connection to a source of electrical power and operable to complete a circuit through the circuit forming means and to energize the means for rotating the shaft, the circuit forming means including a resilient member which biases the pivotally mounted means so that the heater strip is disposed out of the recess when the shaft is stationary, the pivotally mounted means pivoting relative to the shaft in response to centrifugal force upon rotation of the shaft to move the heater strip into the recess.

2. A wire stripper comprising a receptacle means defining an elongate open cavity therealong adapted to receive an end of an insulated electrical conductor, the receptacle means including a first portion and an electrically conductive portion electrically insulated from each other, an electric motor having a rotatable electrically conductive shaft coupled to the receptacle means second portion for rotation of the receptacle means about a conductor received in the cavity thereof in response to operation of the motor, an electrical heater strip disposed adjacent the first portion of the receptacle means laterally from and transverse to the cavity at a location spaced from the open end of the cavity, means coupled to the motor and to the heater strip operable to energize the motor and the heater strip, and means mounting the heater strip and coupled to the receptacle means second portion for rotating with the receptacle means, the mounting means being operable in response to rotation of the receptacle means to move the strip transversely of the cavity to engage the conductor to sever the insulation circumferentially of the conductor, the mounting means including a first electrically conductive ring disposed circumferentially of and pivotally mounted to the receptacle means second portion so that electrical continuity exists therebetween, and a second electrically conductive ring disposed circumferentially of the first ring and carried thereby but being electrically insulated therefrom, one end of the heater strip being coupled to the first ring and the other end of the heater strip being coupled to the second ring.

3. A wire stripper comprising a receptacle means defining an elongate open cavity therealong adapted to receive an end of an insulated electrical conductor, the receptacle means including a first portion and an electrically conductive portion electrically insulated from each other, an electric motor having a rotatable electrically conductive shaft extending from the opposite ends thereof, one end of the shaft being coupled to the receptacle means second portion for rotation of the receptacle means about a conductor receiver in the cavity thereof in response to operation of the motor, an electrical heater strip disposed adjacent the first portion of the receptacle means laterally from and transverse to the cavity at a location spaced from the open end of the cavity, circuit forming means coupled to the motor and to the heater strip operable to energize the motor and the heater strip, and means mounting the heater strip and coupled to the receptacle means second portion for rotating with the receptacle means, the mounting means being operable in response to rotation of the receptacle means to move the strip transversely of the cavity to engage the conductor to sever the insulation circumferentially of the conductor, the mounting means including a first electrically conductive ring disposed circumferentially of and pivotally mounted to the receptacle means second portion so that electrical continuity exists therebetween, and a second electrically conductive ring disposed circumferentially of the first ring and carried thereby but being electrically insulated therefrom, one end of the heater strip being coupled to the first ring and the other end of the heater strip being coupled to the second ring, the circuit forming means including a manually operable electrical switch, a third electrically conductive ring fixedly mounted concentric to the receptacle means second portion in spaced apart relation thereto and conductively coupled to the switch, an electrically conductive spring carried by the second ring and biased between the second and third rings, an electrical contact biased into engagement with the other end of the motor shaft, and a plurality of electrical conductors adapted at a location remote from the wire stripper for connection to a source of electrical power and connected at the wire stripper to the switch, the motor and the contact so that the switch is operable to energize the motor and the heater strip.

References Cited by the Examiner

UNITED STATES PATENTS

| 1,351,186 | 8/1920 | Nelson | 81—9.51 |
|-----------|--------|--------|---------|
| 2,110,621 | 3/1938 | Cohen | 219—372 |
| 2,439,939 | 4/1948 | Lesavoy | 219—244 X |
| 2,452,423 | 10/1948 | Bass | 81—9.51 X |
| 3,089,367 | 5/1963 | Schluter | 81—9.5 |

FOREIGN PATENTS 837,014    6/1960    Great Britain.

WILLIAM FELDMAN, *Primary Examiner.*

MILTON S. MEHR, *Examiner.*